April 3, 1951      A. J. TOTI ET AL      2,547,608
FOWL EVISCERATING TOOL
Filed March 7, 1947
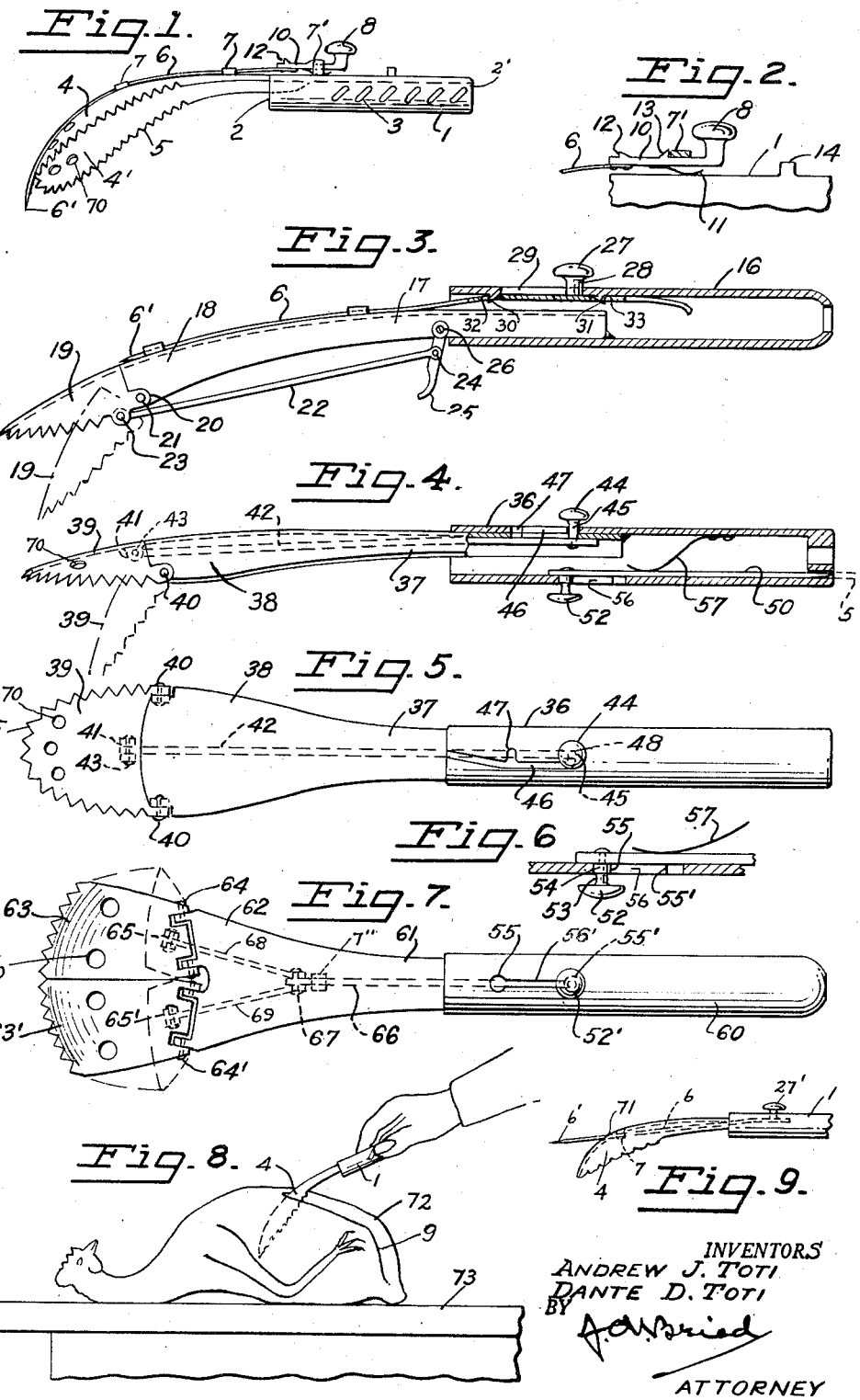
INVENTORS
ANDREW J. TOTI
DANTE D. TOTI
BY
ATTORNEY Patented Apr. 3, 1951

2,547,608

UNITED STATES PATENT OFFICE 2,547,608

FOWL EVISCERATING TOOL

Andrew J. Toti and Dante D. Toti, Modesto, Calif.

Application March 7, 1947, Serial No. 732,980

5 Claims. (Cl. 17—11)

This invention relates to devices or hand tools for manually removing the internal organs from fowls in cleaning them for market or for cooking.

The principal object of the invention is to provide improvements in such an eviscerating tool which will greatly facilitate the work and render it unnecessary to use several different tools to completely clean the fowl.

Particular features and advantages of the invention will appear in the following description and in the accompanying drawings.

In the drawings:

Fig. 1 is a perspective view of one form of the improved eviscerating tool showing its general appearance and its shallow scoop-like outer end with serrated cutting edges.

Fig. 2 is an enlarged detail of the sliding blade locking device used in the tool of Fig. 1.

Fig. 3 is a side view of a modified form of the tool with the outer end of the scoop hinged to the body, and with portions broken away to reveal the internal construction.

Fig. 4 is a side view similar to that of Fig. 3, but showing a further modification in its construction.

Fig. 5 is a back plan view of the tool of Fig. 4.

Fig. 6 is an enlarged detail of Fig. 4 showing the sliding thumb lock for projecting the cutting blade out for use.

Fig. 7 is a back plan view of a still further modification of the tool, in which there are two hinged outer scoop ends.

Fig. 8 is a side view of a chicken positioned on a table and being eviscerated with the aid of the tool shown in Fig. 1.

Fig. 9 shows a modified mounting of the cutting blade.

In further detail, the tool comprises a handle 1 (Figs. 1 and 2) which may be of any design or material, but preferably is a round metal tube open at both ends 2 and 2' to facilitate washing in scalding water and soap after a day's work, and which handle may have a plurality of grooves 3 formed on its outer surface, or be otherwise roughened to yield a better grip as it becomes slimy in use.

Secured to the forward end of the handle as by welding, or formed integrally therewith extends a large shallow spoon-like scoop 4, preferably extending at a gradually increasing angle from the handle, with the concave side of the scoop facing inward or toward the handle, and the edge of the scoop is preferably serrated with relatively large teeth 5 and which are preferably beveled to a sharp edge in the general plane of the scoop wall so as to cut the viscera and attaching membranes loose from the body cavity of the fowl as the scoop is worked around the inside of the fowl, like a serrated edged knife blade.

Extending along the curved back of the scoop is a flexible steel blade 6 which is slidably supported by spaced metal straps or guides 7 which bridge the blade and which straps are secured to or struck up from the metal of the scoop body, and handle, and the inner end of the blade or shank is provided with a thumb or finger operating piece 8 at its inner end, all so that the blade may be slid along the scoop to cause it to project at its forward or cutting end 6' as indicated in the drawing, Fig. 1, or withdrawn within the outer end of the scoop, and locked in either position.

The outer end only of the blade is sharpened on both edges and pointed, to serve both in making the initial body cut 9 along the belly of the fowl (see Fig. 8) and also to be projected more or less as may be required during the loosening of the entrails and attaching membranes from the body of the fowl.

One form of construction of the thumb piece and adjacent parts is shown in Fig. 2 wherein the flexible blade 6 is provided with a somewhat thicker shank 10 to which the thumb piece 8 is secured, and which shank is normally urged outward against one of the guiding straps 7' as by a flat spring 11 to lock in either in or out position of sliding as by spaced latching lugs 12, 13, engaging the strap, a final or limit stop may also be provided on the handle as at 14.

With such a tool held in one hand, and the fowl steadied with the other, as shown in Fig. 8, the operator need never stop to pick up a knife or other tool as he cleans one fowl after the other, as he can make the original belly cut with the tip of the projected blade, and instantly withdraw it for subsequent use to sever or loosen any of the internal organs when he finds the serrated sharp edges of the scoop are not sufficient, then withdraw the freed entrails embraced by the web portion 4' of the scoop, as indicated in Fig. 8, the fowl 72 being supported on a table 73.

As it is desirable to have the scoop curve down quite abruptly in withdrawing the entrails, yet not desirable when first loosening the same from around the body cavity, the variations of Figs. 3, 4, and 7, are important, especially to facilitate use on various sizes of fowls, for in these variations the scoop may extend almost straight out or substantially so, like a very large cooking spoon, to start operations, and the tip of the scoop is pivotally connected to the body portion of the scoop so that the tip may be swung downward like a rake or hoe, without removing the tool from the fowl, when it is desired to withdraw the loosened viscera.

This is accomplished by the construction in Fig. 3, where the handle of the tool is designated 16, the shank of the scoop 17, body 18, and the outer end or tip of the scoop is designated 19, and shown as a separate piece or "flap" formed with side lugs 20 pivotally connected as at 21 respectively with opposite sides of the body portion 18, to swing downwardly from the full line position to the dotted line position indicated in the drawing.

To swing the tip of the scoop down or back again, a link rod 22 is pivotally connected at one end with a pin 23 extending across the inner lower corners of the flap, and pivotally connected at its other end as at 24 with a finger or "trigger" lever 25, in turn pivoted at 26 to the end of the handle 16, so that by pulling on the trigger lever with the finger of the hand holding the tool, the tip or flap may be swung down to the hoe-like position, or it may be swung upwards to the full line position by pushing on the lever, or held in elevated position by blocking it by an advanced position of the hand. Or it may be locked in either position as by any similar means shown in the figures to lock the knife blade in either position.

In this Fig. 3 the same type of flexible knife blade is shown and given the same numeral 6 as in Fig. 1, but its tip 6' is normally positioned just back of the parting joint of the flap 19 so that when the blade is projected for use in cutting, the scoop flap must be swung down, at least somewhat.

In Fig. 3 the flexible blade 6 is shown as continuing into the hollow handle 16 and provided with a thumb operating knob 27 having a shank 28 projecting through a slot 29 in the handle, and a small retaining lug 30, 31, is provided at each end of the slot to respectively engage holes 32, 33, formed in the blade to lock the blade at both ends of travel until released by pressing the knob 27 to push the blade out of engagement with the lug, the spring blade being normally biased to spring outward to engage the lugs.

In the construction of Figs. 4 and 5 the scoop is shown substantially straight like a shallow spoon, and is similar to the form shown in Fig. 3, but the operating connection to the hinged outer end or flap is somewhat different. In these views the hollow handle is designated 36, the shank of the scoop 37, the body 38, flap 39, hinged at 40 to opposite sides of the body portion, and provided with a central lug or lugs 41 to which an operating rod 42 is pivoted at one end at 43, and the other end of the operating rod extends slidably into the hollow handle where it is provided with an operating knob 44 having a neck 45 guided in a slot 46 in the handle, and which neck locks in either of spaced notches 47, 48, the rod 42 being biased to normally urge the neck of the knob into the notches at opposite ends of the travel desired, for swinging the flap end of the scoop up or down.

In the showing of Fig. 4 the knife blade may be the same as shown for Figs. 1 and 3, but is here shown at 50 to slide within the handle to be projected as shown in dotted lines at 51 to extend the cutting tip out of the inner end of the handle, upon operating the slide button 52. This button may have a neck 53 with an enlarged part 54 to lock in either of two or more enlarged portions 55, 55' of a slot 56 in the handle for guiding the button, as shown larger in Fig. 6. A flat bowed spring 57 may be provided to urge the blade and its operating knob toward the slot as indicated.

In Fig. 7, the variation from the form shown in Figs. 4 and 5 is the splitting of the hinged flap or tip of the "scoop" to form two pieces separately hinged to swing outwardly as they swing downwardly, so as to get a wider entrail embracing area for withdrawing the same after it has been loosened.

In this figure the handle is designated 60, the shank of the scoop 61, body 62, separate flaps 63, 63'. The flaps are hinged to the body along angular lines as at 64, 64' so as to spread apart somewhat when swung downwardly to hoe-like position as shown dotted.

In Fig. 7 the operating rod 66 is split or connected as at 67 to two short rods 68, 69, which are respectively pivoted as at 65, 65' with the inside walls of the flap members, in the manner indicated in Figs. 4 and 5. Rod 66 is provided with an operating knob 52' movable along a slot 56' as explained for Fig. 6, also a guide strap 7''.

In several of the views the scoop or paddle portion of the tool is indicated as being perforated by several holes 70. Such holes have been found to increase the traction of the tool upon the slippery viscera and aid in the removal of the same.

The modification shown in Fig. 9 shows the knife blade 6, instead of being slidably mounted along the back of the scoop as in Fig. 1, may be positioned at the inner side of the scoop 4 and arranged to have its point 6' projected through a hole in the scoop at 71 when required for use in the deviscerating operation. The blade may be slidably operated as by a knob 27' as explained for Fig. 3 or as described for the other figures.

From the explanation previously given the operation of the various modifications of the tool in effecting the quick removal of the viscera of chickens, turkeys, ducks, geese, and other table fowl will be clearly understood. Of course there may be two or three sizes of these tools, if desired, for working on very large, medium, and small size fowl, though a single tool may be used effectively over a considerable range of sizes of birds.

In considering the tool as shown in the drawings and described above, and termed herein to be of "shallow spoon-like" form, or to have a "scoop-like" portion, for want of a precise descriptive word, it should be noted that the operative outer end portion may be substantially flat like a paddle, and as substantially indicated by the showing of Figs. 4 and 7, and hence the term "scoop" as used herein and in the claims, is to be taken as including all reasonable modifications of form.

Also to be noted is, that while no slidable knife blade is shown in the modification of Fig. 7, this was omitted only for sake of clarity of the drawing, as it is obvious that it may have a slidable blade substantially the same as any of the blades shown in Figs 3, 4, or 9, and in its most complete form is intended to be fitted with such a blade.

Having thus described our improvements in an eviscerating tool, and the various modifications of the same, what we claim is:

1. A fowl eviscerating tool comprising an elongated handle, a shallow spoon-like scoop having a concave side and extending from one end of and following the same general direction of said handle, the outer end portion of said scoop curving toward the concave side of the scoop out of line with the general extension of the handle, said scoop having a curved outer edge provided with cutting teeth.

2. A structure as set out in claim 1, the handle being hollow and open at both ends.

3. In a structure as set out in claim 1 a cutting blade slidably mounted on said scoop in a manner to project the end of the blade beyond the end of the scoop and be retracted from such projected position, and finger operated means for so operating said blade.

4. A structure as set out in claim 1, the outer end portion of said scoop being hinged to the adjacent portion to swing to a hoe-like position, and finger operated means on said handle for swinging and locking said outer end portion in position.

5. A structure as set out in claim 1 wherein the outer end portion of said scoop is divided longitudinally to form two flaps each separately hingedly connected to the adjacent portion of the scoop at an angle with one another for swinging to hoe-like position while spreading apart laterally.

ANDREW J. TOTI.
DANTE D. TOTI.

REFERENCES CITED

The following references are of record in the file of this patent:

UNITED STATES PATENTS

| Number | Name | Date |
| --- | --- | --- |
| 468,592 | Blackwell | Feb. 9, 1892 |
| 615,432 | Court | Dec. 6, 1898 |
| 1,062,241 | Kelly | May 20, 1913 |
| 1,076,048 | McIntosh | Oct. 21, 1913 |
| 1,369,207 | Wilson | Feb. 22, 1921 |
| D. 140,193 | Lynn | Jan. 30, 1945 |